UNITED STATES PATENT OFFICE.

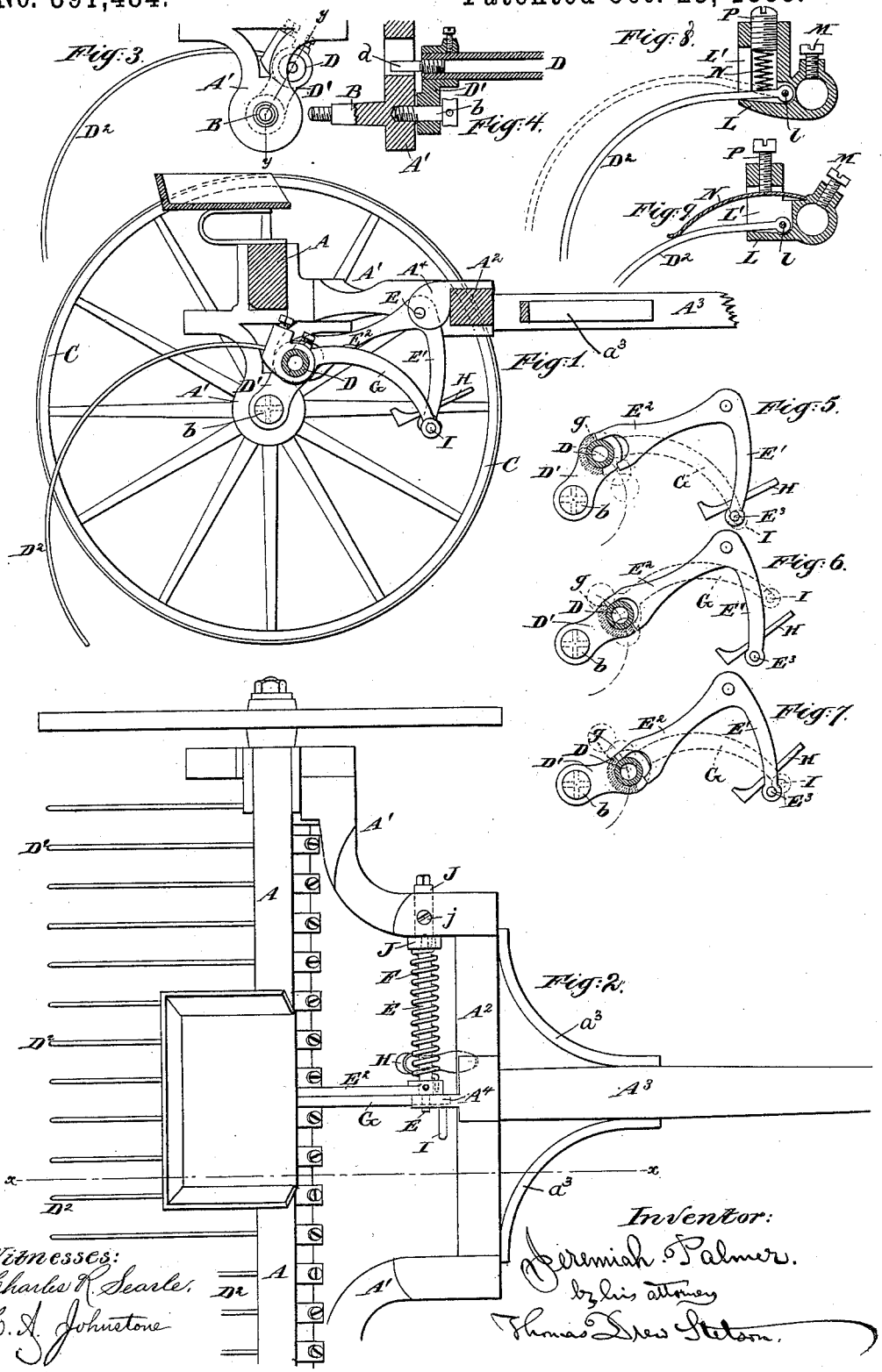

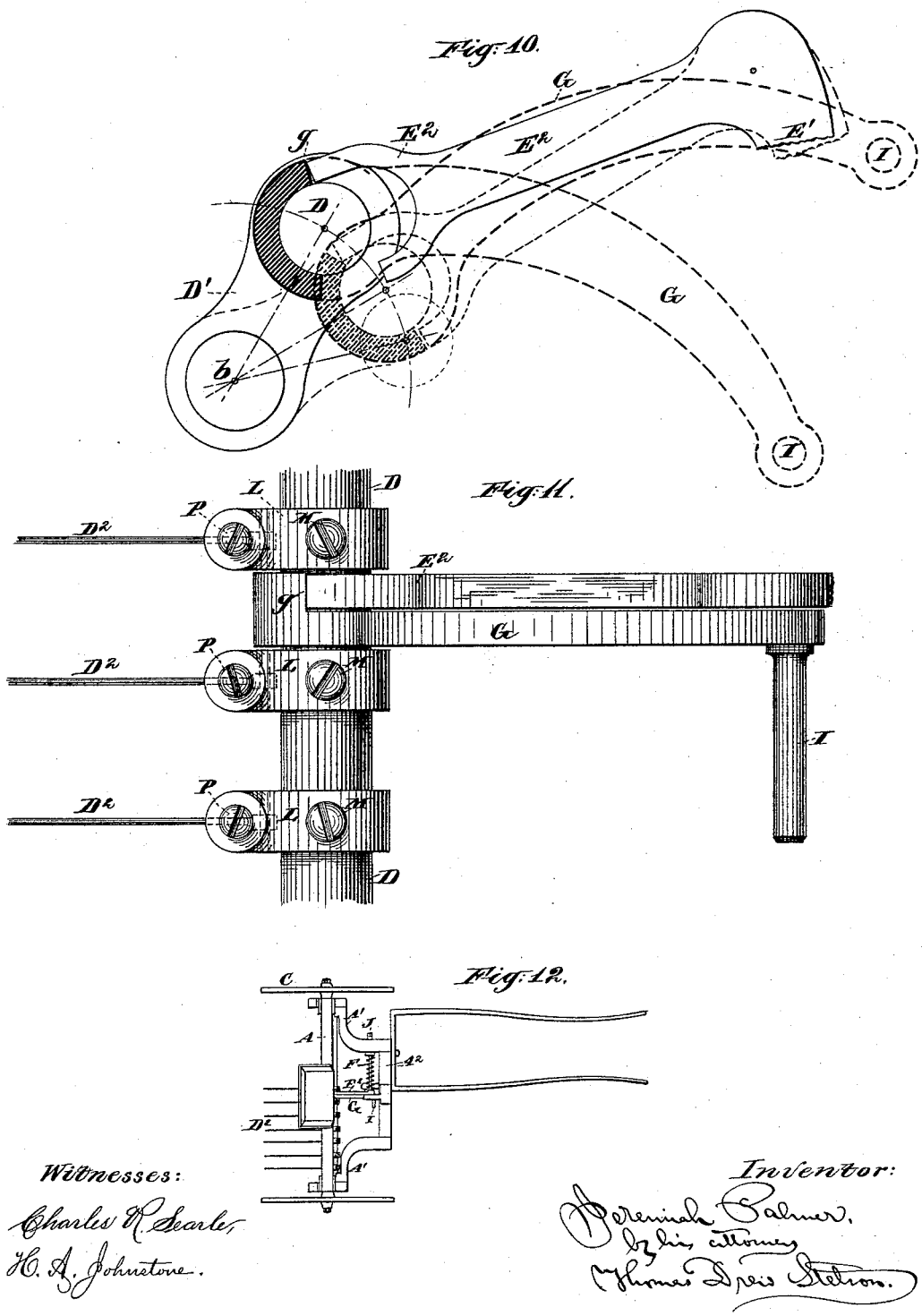

JEREMIAH PALMER, OF BROOKLYN, NEW YORK.

HORSE-RAKE.

SPECIFICATION forming part of Letters Patent No. 391,484, dated October 23, 1888.

Application filed August 27, 1887. Serial No. 248,045. (No model.)

*To all whom it may concern:*

Be it known that I, JEREMIAH PALMER, of Brooklyn, in the county of Kings and State of New York, have invented a certain new and useful Improvement in Horse-Rakes for Hay and Grain, of which the following is a specification.

I partially balance the rake on its axis of motion by setting the teeth in a head which is not in the line of the axis of motion, but is on the opposite side thereof to the teeth. This head is formed with a proper offset or arm at each end to connect with the pivots on which it rocks, like other horse-rakes, to gather and discharge the hay. The weight of the head being by this arrangement on the opposite side of the axis of motion to that of the main portion of the teeth, partially counterbalances it. The wheels which support the machine are mounted on gudgeons, which are set in castings bolted to the main cross-beam of the machine, which beam extends across at a higher level than the axis of the wheels. Each tooth is attached to the head through the aid of an adjustable socket. The tooth is pivoted in the socket subject to the action of a spring, so as to yield to accommodate irregularities in the earth and to allow the teeth to rise in passing over obstacles. Each spring is adjustable. I provide convenient means for tilting or oscillating the rake on its axis of motion by the foot of the attendant. This tilting mechanism may be operated by one foot. An adjustable spring supports the unbalanced portion of the rake with any required degree of force. I provide means for locking the rake in the depressed or in the elevated position. This locking mechanism may be operated by a treadle actuated by the other foot.

The accompanying drawings form a part of this specification and represent what I consider the best means of carrying out the invention.

Figure 1 is a vertical section on the line $xx$ in Fig. 2. Fig. 2 is a plan or top view, a portion being broken away. Fig. 3 is an end elevation of a portion, showing the gudgeons and adjacent parts. Fig. 4 is a section on the line $yy$ in Fig. 3. Figs. 5, 6, and 7 are elevations partly in section, and show the positions of the operating-levers in their various positions. Figs. 8 and 9 are on a larger scale. They are vertical sections showing details in the construction of the rake-tooth socket. Fig. 9 shows a modification. Fig. 10 is a diagram representing certain portions in elevation, partly in vertical section. The strong lines show the conditions when the rake-head is "locked" in the highest position, holding the rake-teeth down upon the ground. The locking-lever is shown in dotted lines in two positions. Fig. 11 is a plan view corresponding to Fig. 10, with the locking-lever depressed. Fig. 12 is a plan view, on a small scale, showing the entire machine adjusted for raking grain by one horse.

Similar letters of reference indicate corresponding parts in all the figures where they occur.

A is the cross-beam of the machine.

A' A' are castings bolted one to each end of the cross-beam and extending forward and inward, connecting to a front cross-bar, A², to which the tongue A³ is attached and strongly braced by $a^3 a^3$, as shown. The castings A' extend down and are provided with gudgeons B, which serve as stub-axles to carry the weight of the machine on wheels C. These wheels perform their usual functions. The screw-bolts $b$ on the inner face of the castings A' form centers on which the rake-head rocks.

D is the main cross piece or head of the rake. This head D is not in the line of the stub-axles B, but is considerably forward thereof. Short studs $d$, tapped in the ends of D, serve as stops to hold the rake-teeth against ever dropping too low. To this head the teeth D² are attached and properly spaced. The means of attachment and adjustment will be described farther on. The head is provided with an offset or arm at each end, as indicated by D', which offsets are fitted on the head and held in place thereon by set-screws, and each of these offsets takes hold loosely on the bolts $b$ on the inner face of the corresponding casting A', and is free to turn thereon to the limited extent required in raising and lowering the rake. The weight and leverage of the rake-teeth D² are much greater than those of the head D. I provide compact and convenient means for aiding the attendant in raising the teeth and holding them locked in the elevated position.

E' E² is a bell-crank lever fixed on a horizontal shaft, E, on the left side of the center of the machine, as shown in Fig. 2. The shaft is subject to the force of a helical spring, F, sometimes termed "spiral." The inner end of the shaft turns in a bracket, A⁴, bolted on the cross-piece A². Its outer end is supported, and turns freely in a socket, J, which extends through the casting A', and serves both as a bearing for this shaft and as an abutment for the spring F. The socket J can be adjusted to increase or diminish the tension of the spring F, so as to tend to shift the rake-teeth with more or less force by slacking the pinching-screw $j$, turning the socket into the new position by applying a wrench to the squared outer end, and retightening. On the arm E' of this bell-crank lever is a horizontal extension, E³, on which one foot of the attendant rests, and by which it may be strongly pressed forward or backward through a suitable shoe or treadle, H. The other arm, E², is forked at its rear end and straddles the head D. When the treadle is pressed forward, it depresses the head D and turns the rake on the axis $b$. When the treadle is drawn backward, by a proper movement of the foot of the attendant placed thereon it raises the head D and depresses the point of the teeth.

G is a locking-lever. It is mounted on the head D with liberty to turn to a limited extent thereon. It is held in contact with the forked end E² of the operating-lever by means of the offset $g$. This locking-lever thus engaged performs an important function. The fact that the head D is fixed in a rigidly-connected set of offsets or arms, D' D'—that is to say, the head D has no motion on its axis relatively to the arms D', but relatively to the other parts—it partially revolves as it describes an arc about the axis of motion $b$. This fact makes it practicable to lock the rake down in its lowest position for raking, or up in its highest position for carrying idly, as traversing along a road, by simply pressing with the foot on the free end of the locking-lever G. So pressing turns the offset $g$ into strong contact with the upper fork of the open end of lever E². Its effect in locking the rake up or down is due to the fact that the arc in which the head D traverses leads it (the head D) deeper into the fork of the arm E² at the center of each traverse and causes it to move out toward the open end of the fork at the end of each traverse. The locking-lever G is provided with a cylindrical hole at its pivotal end, by which it is fitted on the head and matches loosely on the head in the obvious manner. Its offset $g$ abuts against the upper arm of the fork E². When the operator by acting on the lever E' E² raises the rake, the first part of the movement of the descent of the head D in the act of lifting the teeth causes the head to enter more deeply into the fork E². This movement, by its action on the offset $g$, lifts the lever G. During the last part of the rising motion of the rake, which is the farther descending motion of the head, the curved path in which the head D traverses causes it to move again out of the fork E², and by liberating the offset $g$ allows the lever G to drop to about its first position, and, consequently, raising the head D through the same curved path the same operation is repeated. The lever G rises during the first part of the movement, remains elevated during the middle part of the movement, and sinks in the last part.

The arm E' of the lever E' E² is useful in allowing the force of the operator applied on the treadle H to be exerted in raising or lowering the rake; but this arm is not effective in locking the rake in the elevated or depressed position. Such locking is effected by the arm E², against the end of which the abutting surface $g$ on the lever G is pressed.

The rise of the lever G during the first part of the movement of the rake in either direction is quite rapid. This gives a great mechanical advantage in resisting such motion by the foot of the attendant when it is desired to lock the rake in either position. A moderate pressure of the foot of the attendant applied on the laterally-projecting pin I in the free end of lever G, which serves as a treadle therefor, as best seen in Fig. 11, when the rake is in the elevated position by holding the offset $g$ firmly against the upper arm of the fork E² and resisting the tendency of the head to move into the fork, holds the head stationary in the fork, and, consequently, holds the teeth elevated. So, also, when the rake-teeth are down on the ground, acting on the hay, a similar moderate pressure of the foot on the treadle I, by similarly resisting the tendency of the head D to move deeper into the fork E², now serves to hold the rake down. In any condition the lifting of the foot from the treadle I leaves the rake free, and it can be immediately shifted into either the elevated or the depressed position by the action of the other foot on the treadle H. Each tooth turns on a pivot, $l$, in a socket, L, which is fixed by a pinching-screw, M, on the rake-head D. These several sockets are secured in such position that when by the proper action of the lever E' E² the rake is tilted on its axis the teeth D² will be acted on by the base of the socket L and lifted all to a uniform height. When the rake is rocked in the opposite direction, the teeth are lowered, so that their points are in the proper position for raking; but the pivots $l$ allow each tooth to rise independently in its socket. In each socket is a liberal cavity, L', in which is mounted a spiral spring, N, to the action of which the corresponding tooth D² is subject. The upper end of the cavity is internally threaded. The spring N presses on the tooth, finding its abutment in an adjustable cap, P, which is tapped into the upper end of the cavity L', and can be adjusted by partly revolving it in one direction or the other by a suitable screw-driver or wrench.

The socket L may be turned a little on the head D, and resecured by the pinching-screw M to set the tooth to lift higher or to touch the ground sooner on lowering the rake. The cap P is turned a little in one direction or the other to allow the tooth to rise more freely or to be held down more forcibly—or, in other words, to increase or decrease the tension of the spring N. The two adjustments are entirely independent of each other.

Modifications may be made in the details without departing from the principle or sacrificing the advantages of the invention. I can vary the form and arrangement of the springs N, which hold down the teeth. Fig. 9 shows a modification in which a flat bent spring is employed, adjusted by a screw corresponding in position and function to the cap P.

The machine can be changed from a two-horse to a one-horse machine by the substitution of a pair of shafts or thills for the pole shown. It may be changed from hay to grain by using only a portion of the hay-teeth and arranging the thills properly one side of the center. Fig. 12 is a plan view showing the machine adjusted in the latter condition.

I claim as my invention—

1. The rake-head D, curved teeth $D^2$, pivots $l$, springs N, and adjusting-screws P, in combination with each other and with the sockets L, having the cavities L', and set-screws M, arranged to serve substantially as herein specified.

2. The bell-crank lever E' $E^2$, engaged with the rake-head D, carrying the teeth $D^2$, and having the treadle H on the arm E', for operating by the foot, all combined and arranged to serve substantially as herein specified.

3. The helical spring F, adjustable socket J, and confining-screw $j$, in combination with the shaft E, bell-crank lever E' $E^2$ upon said shaft, one end carrying the treadle H and the other end being forked, and the oscillating rake-head D, embraced between said forked ends of the lever, as herein specified.

4. In a horse-rake, the oscillating rake-head D, mounted in the offsets D' and oscillating about its pivotal axis $b$, in combination with the lever E' $E^2$, pivoted on the main frame, one arm, $E^2$, of which is forked at its rear end to embrace the rake-head, and the other arm, E', of which has a treadle by which the lever is operated, the locking-lever G, its rear end loosely fitting the rake-head, and having the offset $g$, to abut against one prong of the forked arm $E^2$, and its front end having a treadle-pin, I, by which the lever is operated to lock the rake-head in either an elevated or depressed position by holding down the lever G, as herein specified.

5. In a horse-rake, the rake-head D, in combination with the locking-lever G, having the treadle I, and offset $g$, turning on such head, and with an arm, $E^2$, pivoted on the framing, the opposite end of which arm receives the offset $g$, all arranged substantially as specified, so as by depressing the treadle I to strongly lock the rake in either the elevated or depressed position, as herein specified.

In testimony whereof I have hereunto set my hand, at New York city, this 9th day of August, 1887, in the presence of two subscribing witnesses.

JEREMIAH PALMER.

Witnesses:
H. A. JOHNSTONE,
M. F. BOYLE.